(12) United States Patent
Rapo

(10) Patent No.: US 8,745,152 B2
(45) Date of Patent: Jun. 3, 2014

(54) SYSTEM AND METHOD FOR SERVER-SIDE AVATAR PRE-RENDERING

(75) Inventor: Andrew Rapo, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 533 days.

(21) Appl. No.: 12/291,224

(22) Filed: Nov. 6, 2008

(65) Prior Publication Data

US 2010/0115022 A1    May 6, 2010

(51) Int. Cl.
  *G06F 15/16*    (2006.01)
(52) U.S. Cl.
  USPC .......................................... 709/217; 709/203
(58) Field of Classification Search
  USPC .................................. 709/217, 203
  See application file for complete search history.

(56) References Cited

U.S. PATENT DOCUMENTS

| 2008/0052242 | A1* | 2/2008 | Merritt et al. | ............ | 705/59 |
| 2008/0090553 | A1* | 4/2008 | Wan et al. | ............ | 455/413 |
| 2008/0098064 | A1 | 4/2008 | Sherinian | | |
| 2008/0215995 | A1* | 9/2008 | Wolf | ............ | 715/758 |

FOREIGN PATENT DOCUMENTS

| JP | 2003-255820 | | 9/2003 |
| JP | 2006-65684 | | 3/2006 |
| JP | 2006-065684 | * | 3/2006 |
| WO | WO 2007/067217 | | 6/2007 |

OTHER PUBLICATIONS

SearchCIO-Midmarket.com, <http://searchcio-midmarket.techtarget.com/definition/Flash>, May 12, 2000.*

* cited by examiner

Primary Examiner — Maceeh Anwari
(74) Attorney, Agent, or Firm — Farjami & Farjami LLP

(57) ABSTRACT

There is provided a system and method for server-side avatar pre-rendering. There is provided a server for providing pre-rendered avatars, the server comprising a memory and a processor. The processor is configured to receive a request from a client for an avatar distinguished by a unique identifier to be pre-rendered, retrieve avatar render data using the unique identifier, process the avatar render data through an avatar pre-render application to create a pre-rendered avatar in a defined representation, write the pre-rendered avatar into the memory, and send the pre-rendered avatar from the memory to the client in response to the request. The pre-rendered avatar may further be written to a non-volatile storage, providing cached responses to future requests of the pre-rendered avatar. The avatar render data may include vectors or polygons, and the defined representations may include static bitmap images or animated video segments.

13 Claims, 4 Drawing Sheets

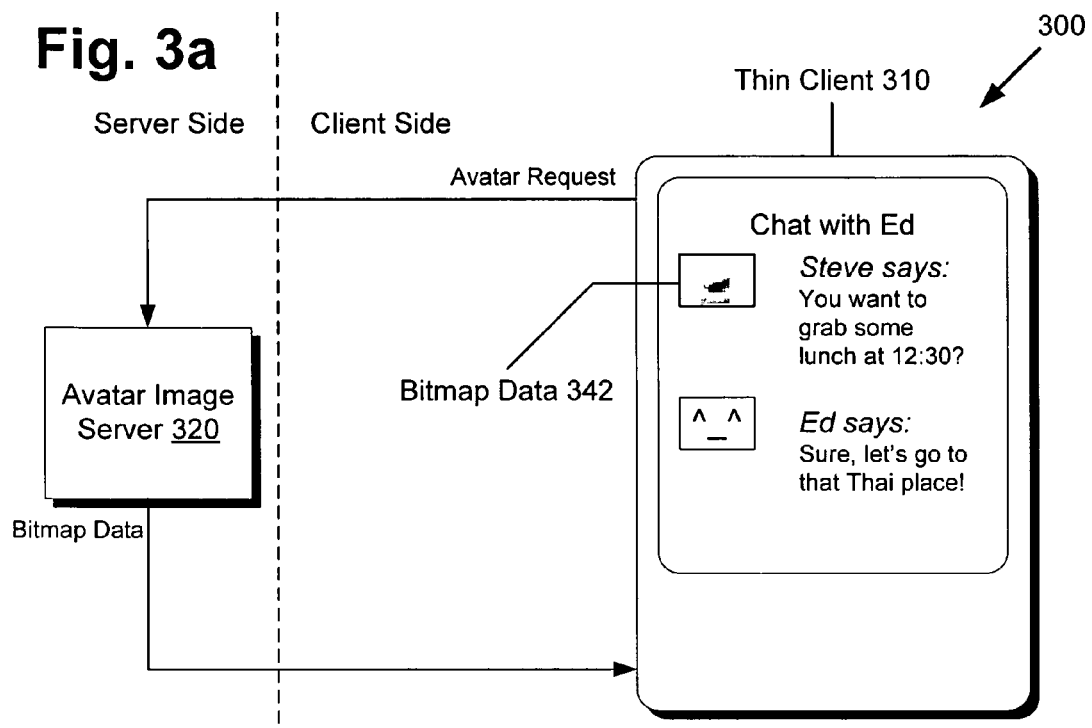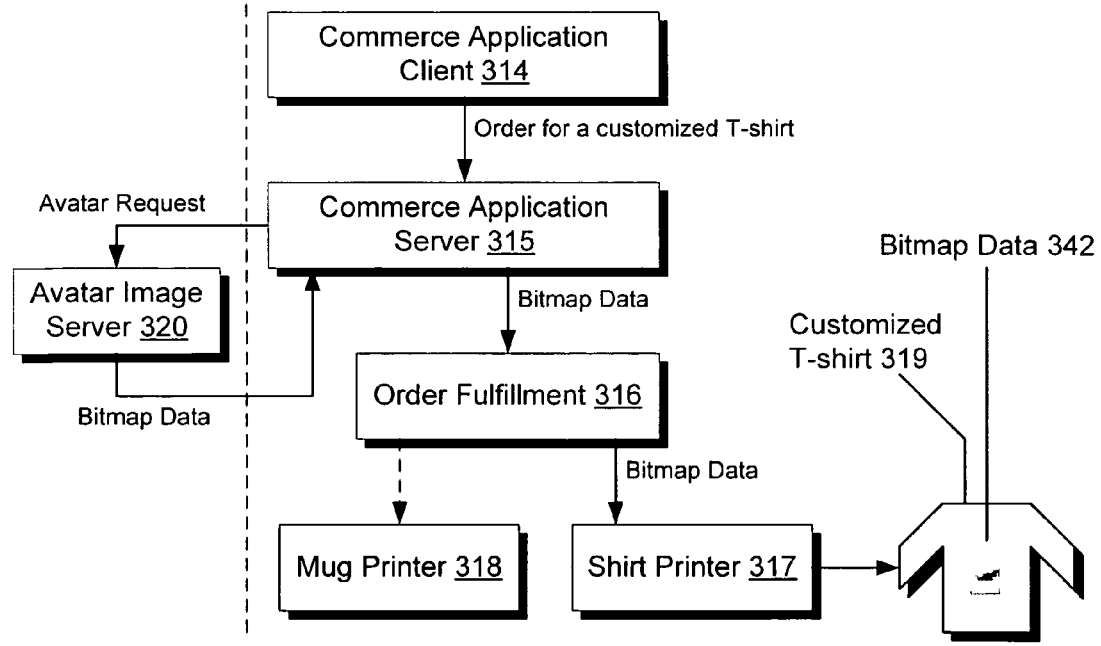

SYSTEM AND METHOD FOR SERVER-SIDE AVATAR PRE-RENDERING

BACKGROUND OF THE INVENTION

1. Field of the Invention

The present invention relates generally to processing of digital data. More particularly, the present invention relates to systems for data conversion of the visual representation for images and videos.

2. Background Art

Customizable avatars representing users in games and entertainment have become a common and desirable feature among users. Users often spend countless hours customizing and interacting with their avatars, which often become an extension of their individual expression. Thus, users may find themselves wanting to display and share their avatars in as many places as possible, by themselves and socially with others. With the proliferation of portable computing devices and the growth of electronic commerce, various services and goods can be developed to satisfy the needs of users wanting to spend more quality time with their beloved avatars.

However, these customizable avatars are often rendered by complex avatar systems that may be difficult or impossible for certain environments to support, particularly legacy application systems and low power thin client devices with limited computing resources. Three-dimensional multi-layered avatars might be easily supported by modern personal computers, but less powerful configurations such as mobile phones or web-based applications may provide an insufficiently powerful rendering environment. Even in the context of a sufficiently capable environment, an alternative data representation of the avatar might be preferable to the raw rendering data. Providing custom multi-platform rendering code to meet specific requirements may provide a solution, but it may quickly become an expensive development proposition due to varying hardware architectures and operating systems. Additionally, should the avatar system change and evolve over time as many avatar systems do, code maintenance to implement those changes may become an intractable mess.

Accordingly, there is a need to overcome the drawbacks and deficiencies in the art by providing a way to render avatars in a desired manner across multiple environments without requiring undue development costs and maintenance.

SUMMARY OF THE INVENTION

There are provided systems and methods for server-side avatar pre-rendering, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3a and FIG. 3b present block diagrams of a network including a server providing pre-rendered avatars to specific client examples, according to one embodiment of the present invention.

DETAILED DESCRIPTION OF THE INVENTION

The present application is directed to a system and method for server-side avatar pre-rendering. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
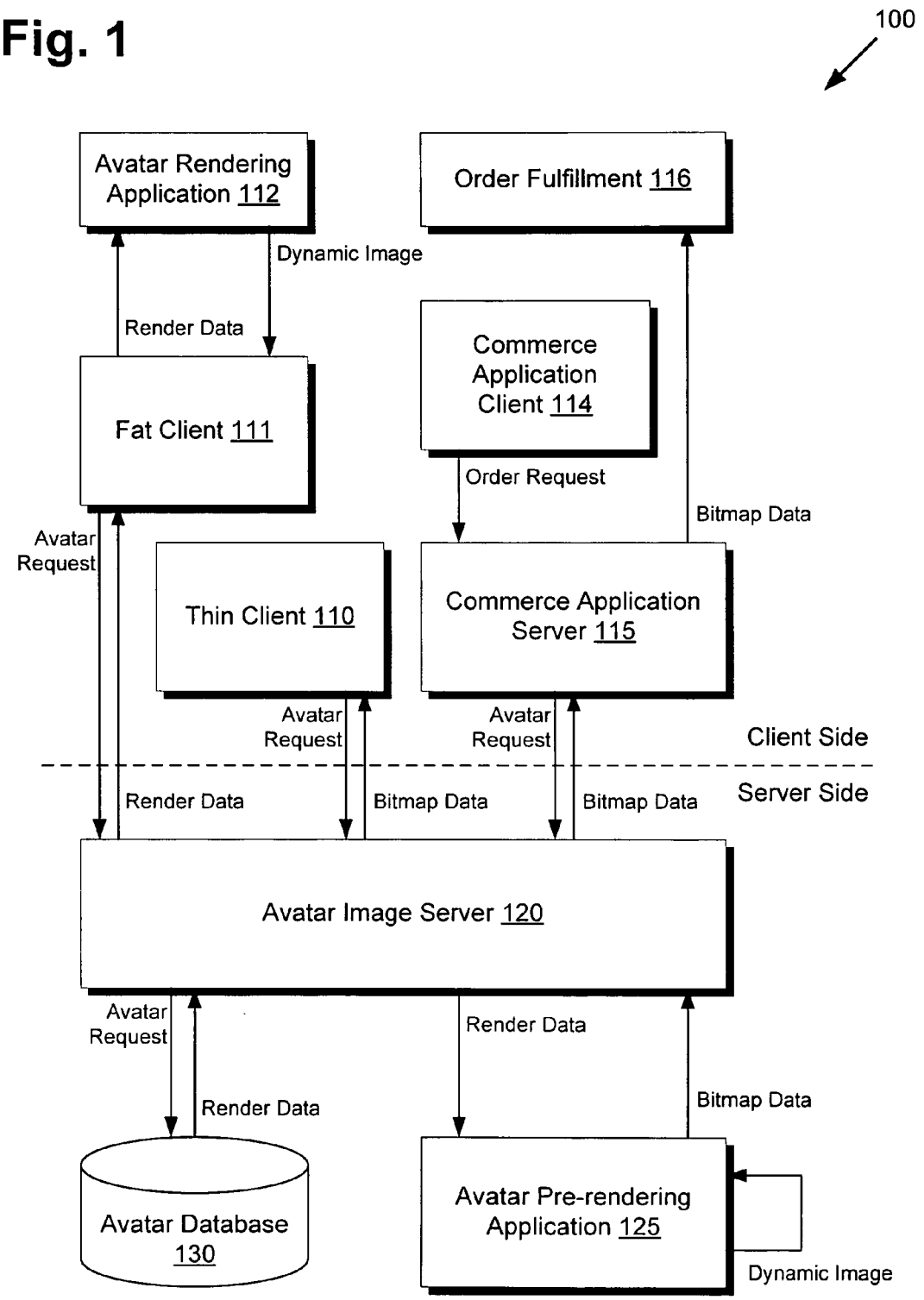
FIG. 1 presents a block diagram of a network including a server providing pre-rendered avatars, according to one embodiment of the present invention.

FIG. 1 presents a block diagram of a network including a server providing pre-rendered avatars, according to one embodiment of the present invention. Avatar includes a computer user's representation of himself/herself or alter ego, whether in the form of a three-dimensional model used in computer games, or a two-dimensional picture, or a text construct, or a video segment including one such representation. Network 100 includes thin client 110, fat client 111, avatar rendering application 112, commerce application client 114, commerce application server 115, order fulfillment 116, avatar image server 120, avatar pre-rendering application 125, and avatar database 130. Network 100 is divided into a "Client Side" and "Server Side" with respect to avatar image server 120. Thin client 110 can process information because it has an onboard processor, but its function is restricted, has less internal applications and mainly relies on a central server for processing activities, as compared to fat client 111, which has a more powerful processor, more internal applications and is mainly independent of the central server for processing activities.

On the "Client Side," there are three clients requesting avatars from avatar image server 120: thin client 110, fat client 111, and commerce application server 115. These avatars might comprise, for example, vector based two-dimensional images of online game characters. Alternative embodiments might use three-dimensional polygon based characters for avatars. Fat client 111 might represent a personal computer running an instance of a game client for the online game, which could be a Flash or Java application, for example. Since fat client 111 has the capability of locally rendering dynamic images via avatar rendering application 112, when it sends an "avatar request" to avatar image server 120, it simply requests the actual "render data" for the avatar, rather than a pre-rendered representation. By passing the "render data" through rendering application 112, fat client 111 allows a user to play an online game with the avatar representing the user during gameplay as a "dynamic image." For example, avatar rendering application 112 might dynamically arrange the vectors comprising the avatar on a display to allow avatar movement and actions such as swinging a sword in response to user input. This rich interaction is enabled by the hardware processing capabilities of fat client 111 in conjunction with rendering application 112.

On the other hand, thin client 110 may not have the same rich hardware processing capabilities of fat client 111, relying on server-side processing approach to accomplish computing intensive tasks. For example, thin client 110 might comprise a mobile phone with limited processing power for preserving battery life. The mobile phone may thus lack the proper hardware and/or software environment to support real-time native rendering of vector graphics. In this scenario, thin client 110 might request a pre-rendered avatar in a low-resolution bitmap representation for optimal viewing within the limited viewing space offered by a display of the mobile phone. Thin client 110 might explicitly request the low-resolution bitmap representation, or avatar image server 120 might automatically provide a low-resolution bitmap representation based on an identification handshake.

For example, a defined category named "low power mobile internet devices" might be associated with low-resolution bitmap representations by default. When thin client 110 contacts avatar image server 120, a platform or operating system identifier indicating that thin client 110 is a mobile phone might lead avatar image server 120 to categorize thin client 110 as a "low power mobile internet device." Correspondingly, a low-resolution bitmap representation of the requested avatar can be provided automatically. However, this automatic association might be manually overridden by explicitly specifying the desired representation from the client side.

Whereas a low-resolution bitmap may suffice for a mobile phone display, other applications may require higher resolution bitmaps, or bitmaps using alternative color spaces. For example, commercial printing applications tend to require at least 300 to 600 dots per inch (DPI) of resolution to avoid the appearance of large dots in printed materials. Additionally, although the sRGB or standard Red Green Blue color space is used for most electronic displays, the CMYK (Cyan Magenta Yellow Key) color space may be more appropriate for ink printing.

For example, if commerce application server 115 represents a web server that allows clients to place orders for customized t-shirts with printed avatars, commerce application client 114 might represent a web browser where a customer places an "order request" through commerce application server 115. In turn, commerce application server 115 requests a pre-rendered high-resolution bitmap representation of the ordered avatar from avatar image server 120. Since the avatar image is destined for printing, commerce application server 115 might further specify the CMYK color space as the desired format. Once avatar image server 120 returns the appropriate "bitmap data," it might be forwarded to order fulfillment 116, where a t-shirt printing apparatus prints the avatar on a t-shirt to be shipped to the customer.

Moving to the "Server Side," there are three components depicted: avatar image server 120, avatar pre-rendering application 125, and avatar database 130. Avatar image server 120 acts as an intermediary abstraction layer, providing avatar data in a specified representation for clients. To that end, it accesses avatar database 130 to retrieve the original avatar "render data," and it uses avatar pre-rendering application 125 to transform the avatar render data into a specified representation. Avatar pre-rendering application 125 might share the same client-side rendering code as avatar rendering application 112, allowing efficient code reuse and minimizing development and maintenance costs. For example, if avatar rendering application 112 represents Flash or Java based client code running the online game, avatar pre-rendering application 125 can use that same Flash or Java based rendering code for image pre-rendering purposes. Thus, avatar pre-rendering application 125 can render the same "dynamic image" as avatar rendering application 112, perhaps drawing the avatar in a particular pose, or generating a short animated video segment by processing the render data through, for example, a dance move algorithm. This pre-rendered data can then be converted into "bitmap data" for responding to the original avatar request from the client. Furthermore, avatar image server 120 might format the bitmap data into a standardized file format such as PNG (Portable Network Graphics), JPEG (Joint Photographic Experts Group), or MNG (Multiple-image Network Graphics), or the client and/or some other component may handle and format the raw image or movie data appropriately.

The server-side arrangement depicted in FIG. 1 is merely exemplary and configured for ease of discourse; many other valid configurations could be utilized. For example, to support multiple different online games and applications, avatar image server 120 might access multiple avatar databases and multiple avatar pre-rendering applications, negotiating the particular database and application to use based on the online game or application specified by an avatar request. Additionally, although avatar database 130 and avatar pre-rendering application 125 are shown as independent blocks from avatar image server 120, they could actually be consolidated into a single server workstation, or spread across several server workstations for distributed computing workloads.

Figure 2:
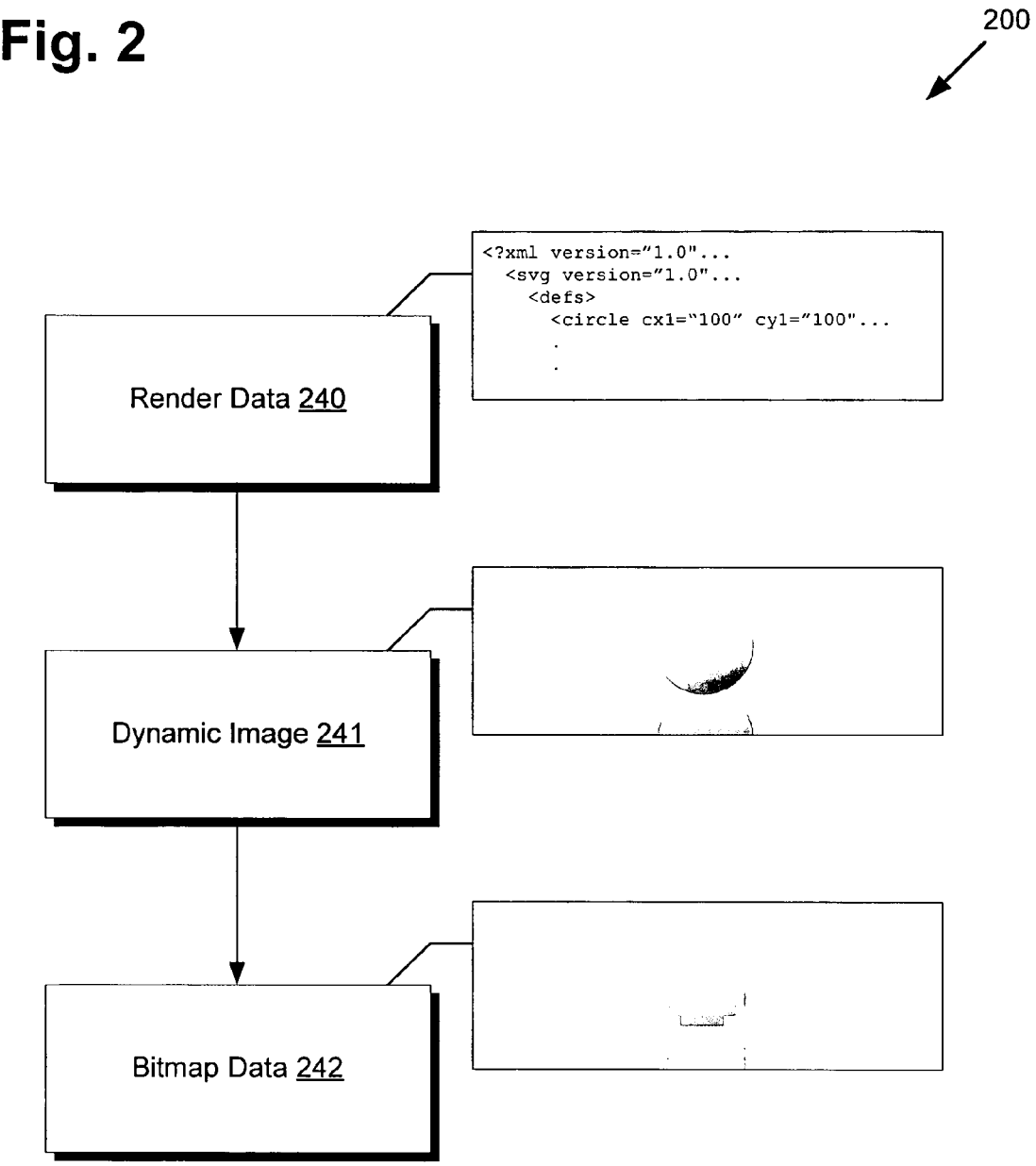
FIG. 2 presents a flowchart of render data undergoing representational transformation, according to one embodiment of the present invention.

FIG. 2 presents a flowchart of render data undergoing representational transformation, according to one embodiment of the present invention. Flowchart 200 includes render data 240, dynamic image 241, and bitmap data 242. The data transformations depicted in flowchart 200 might be executable by avatar pre-rendering application 125 or avatar rendering application 112 of FIG. 1.

Render data 240 may comprise the original avatar "render data" referenced throughout FIG. 1. As shown in FIG. 2, render data 240 is depicted as XML (Extensible Markup Language) using the SVG (Scalable Vector Graphics) specification. The XML data describes the visual rendering details of the avatar, which in FIG. 2 includes a few simple geometric shapes. This is only exemplary and many other data formats could describe the visual depiction of an avatar. For example, if render data 240 described a three-dimensional avatar, render data 240 might comprise a list of polygon coordinates creating the surfaces of the avatar, with related texture maps to render on top of the surfaces. Regardless of the particular data format, render data 240 must be parsed through a renderer to provide visual images.

Thus, render data 240 might be parsed through a vector based rendering engine programmed in Flash or Java, resulting in dynamic image 241 referenced as "dynamic image" throughout FIG. 1. Dynamic image 241, as the name suggests, might be posed, moved, and otherwise transformed on a display, rather than presented as a static image. By continually interpreting render data 240 with particular render parameters, such as lighting, positioning, and posing, dynamic image 241 can be made to animate in a preset pattern or react to user input. Thus, for example, avatar rendering application 112 of FIG. 1 can support real-time online gameplay using the avatar as an on-screen player character.

Similarly, avatar pre-rendering application 125 of FIG. 1 can create dynamic image 241 using the same dynamic rendering capabilities as avatar rendering application 112, but it can also create pre-rendered bitmap data 242 for use by clients without dynamic rendering capabilities, referenced as "bitmap data" in FIG. 1. Bitmap data 242 may be readily generated by capturing or processing dynamic image 241 at particular points in time. As shown in FIG. 2, bitmap data 242 comprises an array of pixels, with the resolution slightly exaggerated towards the low side to emphasize the bitmap aspect of the image, to contrast with the freely scalable vectors used in dynamic image 241. As previously discussed, bitmap data 242 might also comprise multiple images to support pre-rendered animated video segments.

FIG. 3a and FIG. 3b present block diagrams of a network including a server providing pre-rendered avatars to specific client examples, according to one embodiment of the present invention. Since FIG. 1 has presented a generalized view of the avatar pre-rendering system, FIG. 3a and FIG. 3b supplement that view with specific examples that may facilitate in understanding of the system. FIG. 3a includes thin client 310, avatar image server 320, and bitmap data 342. FIG. 3b includes commerce application client 314, commerce application server 315, order fulfillment 316, shirt printer 317, mug printer 318, customized t-shirt 319, avatar image server 320, and bitmap data 342. Thin client 310 corresponds to thin client 110 from FIG. 1. Commerce application client 314 corresponds to commerce application client 114 from FIG. 1. Commerce application server 315 corresponds to commerce application server 115 from FIG. 1. Order fulfillment 316 corresponds to order fulfillment 116 from FIG. 1. Avatar image server 320 corresponds to avatar image server 120 from FIG. 1. Bitmap data 342 corresponds to bitmap data 242 from FIG. 2.

Network 300 of FIG. 3a illustrates an example client with a text chat application. Thin client 310 might comprise an Internet connectible mobile smartphone using custom low power hardware and a proprietary operating system. The user using thin client 310, Steve, might want to have his online gaming avatar as an icon representing him during text chats. However, due to the restricted hardware and software environment presented by thin client 310, providing a real-time vector-based renderer may be impractical, leaving pre-rendered images as an attractive alternative. Thus, a text chat application running on thin client 310 might be configured to send an "avatar request" to avatar image server 320 for retrieving pre-rendered "bitmap data" that can be used as an icon. Once retrieved, bitmap data 342 can be shown on a display of thin client 310, identifying Steve with his online gaming avatar during text chats with Ed or any other user.

Network 300 of FIG. 3b illustrates an example client with an e-commerce application for printing customized goods. Commerce application server 315 might represent an online web presence specializing in providing customized goods mailed to customers. Continuing with the user from FIG. 3a, Steve might use a web browser at his personal computer, commerce application client 314, to access commerce application server 315. A web service module on commerce application server 315 might interface with avatar image server 320, allowing Steve to use his online game avatar as a graphic for any custom goods he wants to order. As an example, Steve might send an "order for a customized t-shirt" having his online game avatar printed on the front. Commerce application server 315 then contacts avatar image server 320, sending an "avatar request" for a pre-rendered bitmap version of the avatar associated with Steve in the online game, rendered in high resolution 300 DPI in the CMYK color space most suited for printing. The returned "bitmap data" is forwarded to order fulfillment 316, which determines that Steve requested a t-shirt and thus forwards it to shirt printer 317 rather than mug printer 318 or some other goods printing device. At shirt printer 317, bitmap data 342 is then printed onto customized shirt 319, which can then be packed and shipped to Steve.

Figure 4:
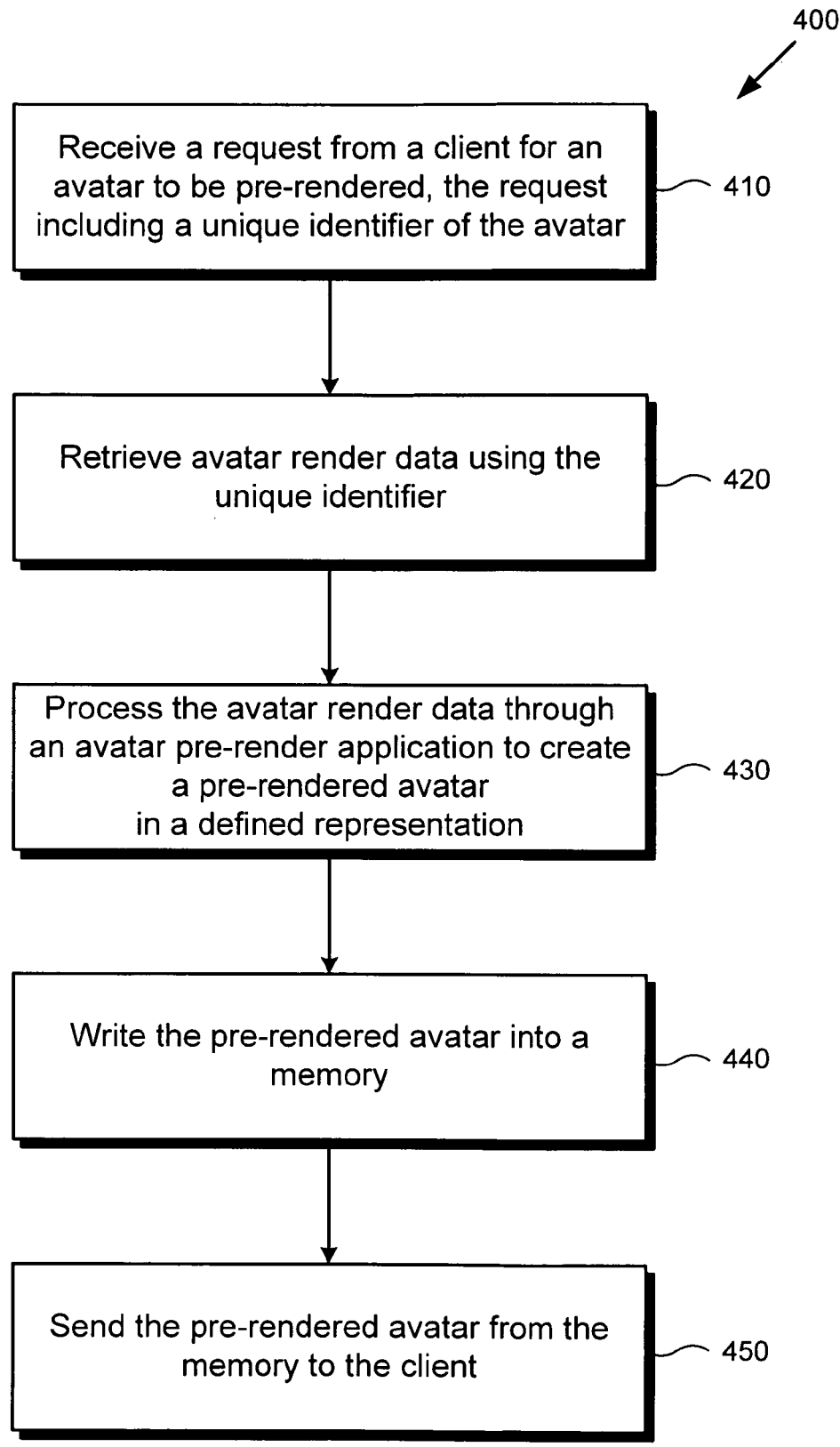
FIG. 4 shows a flowchart describing the steps, according to one embodiment of the present invention, by which a server having a memory can provide pre-rendered avatars.

FIG. 4 shows a flowchart describing the steps, according to one embodiment of the present invention, by which a server having a memory can provide pre-rendered avatars. Certain details and features have been left out of flowchart 400 that are apparent to a person of ordinary skill in the art. For example, a step may comprise one or more substeps or may involve specialized equipment or materials, as known in the art. While steps 410 through 450 indicated in flowchart 400 are sufficient to describe one embodiment of the present invention, other embodiments of the invention may utilize steps different from those shown in flowchart 400.

Referring to step 410 of flowchart 400 in FIG. 4 and network 100 of FIG. 1, step 410 of flowchart 400 comprises avatar image server 120 receiving a request from thin client 110 for an avatar to be pre-rendered, the request including a unique identifier of the avatar. Continuing with the online game example with the user Steve, this unique identifier might comprise, for example, a database key that uniquely identifies the online game account associated with Steve. This request might be transmitted over a wired or wireless network connection, using standard protocols such as the Internet Protocol Suite or TCP/IP.

Referring to step 420 of flowchart 400 in FIG. 4 and network 100 of FIG. 1, step 420 of flowchart 400 comprises avatar image server 120 retrieving avatar render data from avatar database 130 using the unique identifier of step 410. Thus, the database key from step 410 is queried in avatar database 130 to retrieve render data representing the avatar for Steve.

Referring to step 430 of flowchart 400 in FIG. 4 and network 100 of FIG. 1, step 430 of flowchart 400 comprises avatar image server 120 processing the avatar render data from step 420 though avatar pre-rendering application 125 to create a pre-rendered avatar in a defined representation. If, for example, thin client 110 is classified as a "low power mobile internet device" with a limited size display, the representation might be defined as a low-resolution bitmap image. As previously discussed, this representation might be chosen automatically due to the identification of thin client 110, or thin client 110 might directly specify the desired representation. The transformation steps depicted in FIG. 2 might be executed by avatar pre-rendering application 125 to generate bitmap data 242, the pre-rendered avatar in the low-resolution bitmap image representation. For example, avatar pre-rendering application 125 might comprise a Flash application executed by a Flash Player run-time environment, the Flash application sharing the same Flash rendering code as avatar rendering application 112 for the online game.

Referring to step 440 of flowchart 400 in FIG. 4 and network 100 of FIG. 1, step 440 of flowchart 400 comprises avatar image server 120 writing the pre-rendered avatar from step 430 into a memory. This memory might comprise volatile Dynamic Random Access Memory (DRAM) installed in avatar image server 120. Additionally, avatar image server 120 might write the pre-rendered avatar from step 430 into a more permanent non-volatile storage for providing cached results in the future. For example, if thin client 110 will make many requests for Steve's avatar, it may save processing resources to simply save the pre-rendered representation in a local cache database. When thin client 110 or any other client requests Steve's pre-rendered avatar, that pre-rendered avatar can be simply retrieved from the local cache database, assuming the desired representation already exists in the local cache database.

Referring to step 450 of flowchart 400 in FIG. 4 and network 100 of FIG. 1, step 450 of flowchart 400 comprises avatar image server 120 sending the pre-rendered avatar stored from the memory of step 440 to thin client 110. This transaction may occur using similar protocols and network resources as step 410. Once this step is completed, the original request of thin client 110 is also satisfied, and the process is complete.

As part of the advantages of various embodiments of the present invention, a centralized server or servers can provide pre-rendered avatars in a number of desired representations. By efficiently reusing the same rendering code as the original client software using the avatars, code maintenance and development costs are kept under control. Platforms with limited processing capability or architectures that are difficult for development can be easily supported thanks to the pre-rendering capabilities of the system. Additionally, complex or legacy applications systems requiring data in specific formats can be accommodated without costly and potentially risky modifications to existing code bases.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A server for providing pre-rendered avatars using an avatar pre-render application, the server comprising:
   a memory; and
   a processor to:
      receive a request from a client for an avatar, the request including a unique identifier of the avatar;
      retrieve avatar render data using the unique identifier;
      process the avatar render data through the avatar pre-render application executing in a run-time environment to create a pre-rendered avatar data in a bitmap data representation of the avatar, wherein the bitmap data representation is determined by a category of a client device;
      write the bitmap data representation of the avatar into the memory; and
      send the bitmap data representation of the avatar from the memory to the client in response to the request.

2. The server of claim 1, wherein the avatar render data is retrieved from an avatar database, and wherein the unique identifier is a key of the avatar database.

3. The server of claim 1, wherein the avatar render data includes XML data visually describing the avatar.

4. The server of claim 1, wherein the avatar render data includes data describing a plurality of two dimensional vectors.

5. The server of claim 1, wherein the avatar render data includes data describing a plurality of three dimensional polygons.

6. The server of claim 1, wherein the client specifies the defined representation.

7. The server of claim 1, wherein the pre-rendered avatar data is further written to a non-volatile storage for providing cached responses to future requests of the pre-rendered avatar data.

8. A method for use by a server having a memory to provide pre-rendered avatars using an avatar pre-render application, the method comprising:
   receiving a request from a client for an avatar, the request including a unique identifier of the avatar;
   retrieving avatar render data using the unique identifier;
   processing the avatar render data through the avatar pre-render application executing in a run-time environment to create a pre-rendered avatar data in a bitmap data representation of the avatar, wherein the bitmap data representation is determined by a category of a client device;
   writing the bitmap data representation of the avatar into the memory; and
   sending the bitmap data representation of the avatar from the memory to the client in response to the request.

9. The method of claim 8, wherein the avatar render data includes XML data visually describing the avatar.

10. The method of claim 8, wherein the avatar render data includes data describing a plurality of two dimensional vectors.

11. The method of claim 8, wherein the avatar render data includes data describing a plurality of three dimensional polygons.

12. The method of claim 8, wherein the client specifies the defined representation.

13. The method of claim 8, further comprising:
   writing the pre-rendered avatar data to a non-volatile storage for providing cached responses to future requests of the pre-rendered avatar data.

* * * * *